Patented Dec. 2, 1952

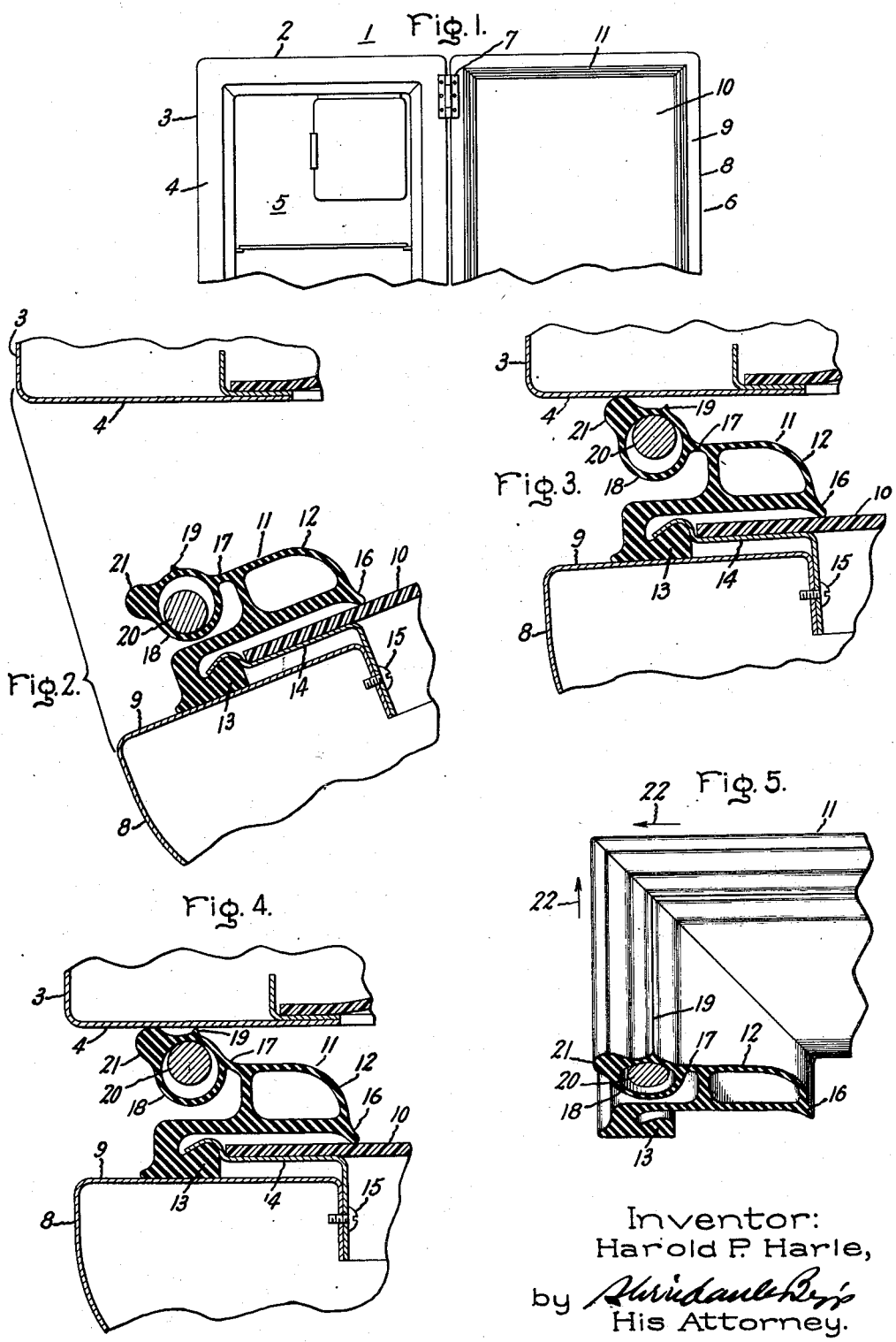

2,619,693

UNITED STATES PATENT OFFICE 2,619,693

MAGNETIC GASKET SECTION

Harold P. Harle, Erie, Pa., assignor to General Electric Company, a corporation of New York Application February 26, 1952, Serial No. 273,510

6 Claims. (Cl. 20—69)

My invention relates to gaskets for sealing cabinets and pertains more particularly to magnetic gaskets.

In cabinet constructions such as refrigerators wherein a temperature is maintained differing substantially from ambient temperature, it is customary to provide a gasket adapted to encircle the access opening of the cabinet for sealing the areas around the access opening against leakage. Often a magnetic gasket is employed for this purpose. A magnetic gasket is usually mounted on the door closing the access opening of the cabinet and carries magnetic elements which are attracted to the portion of the outer case framing the access opening, thereby pressing a continuous sealing rib formed on the gasket into sealing engagement with the outer case. It is the primary object of my invention to provide an improved magnetic gasket for insuring satisfactory sealing engagement between the sealing rib and the outer case.

Further objects and advantages of my invention will become apparent as the following description proceeds and the features of novelty which characterize my invention will be pointed out with particularity in the claims annexed to and forming part of this specification.

In carrying out the objects of my invention, I provide an elastic gasket comprising a base section and a hingedly connected tubular section. The tubular section carries elongated magnets and is formed to include a continuous cabinet-engaging sealing rib. Also formed on the tubular section is a continuous outwardly extending cabinet-engaging bead whereby satisfactory cabinet engagement of the sealing rib is insured.

For a better understanding of my invention, reference may be had to the accompanying drawing in which Fig. 1 is a fragmentary view of a refrigerator including an embodiment of my invention; Fig. 2 is an enlarged sectional view illustrating details of the gasket construction and wherein the door is shown in an open position; Fig. 3 is an enlarged sectional view showing the door in a closing position; Fig. 4 is an enlarged sectional view showing the door in a closed position; and Fig. 5 is an enlarged fragmentary detail view of a corner of the gasket.

Referring to Fig. 1, there is shown a refrigerator 1 including a cabinet 2. The cabinet 2 includes a metal outer case 3 which is shaped to provide a face portion 4 framing an access opening of the storage compartment 5 of the refrigerator.

A door generally designated 6 is provided for closing the access opening of the cabinet, the door being hinged to the cabinet by a pair of hinges 7, only one of which is shown. The door 6 comprises an outer door 8 having a face portion 9 and an inner door 10.

Mounted on the face portion 9 of the outer door 8 is a rectangular gasket 11 formed of an elastic material such as rubber or the like. The gasket 11 is provided for sealing the refrigerator about the access opening of the cabinet. As seen in Figs. 2, 3 and 4, the gasket 11 is formed to include a first or base section 12. Along the outer edges of the base section 12 is formed a fastening rib 13. Provided for clamping the fastening rib 13 and thereby securing the gasket 11 to the face portion 9 of the outer door 8 is a retainer 14. The retainer 14 is secured to the outer door 8 by screws or other suitable fastening means, one of which is shown at 15. Formed along the inner edge of the base section 12 is a toe portion 16 which normally engages the inner door 10.

Hingedly connected to the base section 12, as at 17, is a second or tubular section 18. Formed on the tubular section 18 and projecting toward the face portion 4 of the outer case 3 is a continuous sealing portion or rib 19. Assembled within the tubular section 18 in spaced apart relation is a plurality of elongated cylindrical magnets 20. The outer case of the cabinet 2, including the face portion 4, is fabricated of magnetic material such as steel. The magnets 20 are attracted by the face portion 4 and press the sealing rib 19 on the tubular section 18 into sealing engagement with the face portion. The broad idea of magnets disposed within a gasket and arranged to be attracted to the face portion of a refrigerator cabinet for sealing the access opening of the food storage compartment is not my invention but is described and claimed in an application of Alfred G. Janos, Serial No. 122,961, filed October 22, 1949, and assigned to the same assignee as the present invention.

Also formed on the tubular section 18 is a continuous outwardly extending portion or bead 21 which is inclined slightly toward the cabinet. The height from the base of the fastening rib 13 to the top of the bead 21 is approximately the same as the height from the base of the fastening rib 13 to the top of the sealing rib 19. This feature may be brought out better by saying that the top of the bead and the top of the sealing rib are in a plane substantially parallel to the face portion 9 of the outer door 8. When the door 6 is opened to an extent where the air gap between the magnets 20 and the face portion 4 on the outer case 3 is greater than the air gap between the magnets 20 and the face portion 9 on the outer door 8, the magnets 20 are attracted by the door face portion 9 and cause the tubular section 18 to rotate about the hinge connection 17 toward the door in the manner shown in Fig. 2. When the door is closing in the manner shown in Fig. 3, the air gap between the magnets 20 and the face portion 4 of the outer case 3 decreases until the magnets are attracted by the face portion 4 and thereby cause the tubular section 18 to rotate toward the face portion of the outer case or inwardly about the hinge connection 17. As seen in Fig. 3, this rotation causes the bead 21 to engage the face portion 4 of the outer case 3 in advance of the sealing rib 19. Thereafter, attraction of the magnets 20 by the face portion 4 causes the tubular section 18 to rotate outwardly, or to rotate about the point engaged by the bead 21 and toward the face portion 4. The rotation continues until the sealing rib 19 is brought into engagement with the face portion 4, at which time the minimum air gap between the face portion 4 and the magnets 20 exists across the wall of the tubular section 18 adjacent the sealing rib 19 and between the bead 21 and the sealing rib 19. As a result, the magnets 20 tend to cause the tubular section 18 to continue rotating outwardly about the point engaged by the bead 21 whereby the sealing rib 19 is maintained in satisfactory sealing engagement with the face portion 4 when the door is closed. This tendency of the tubular section 18 to continue rotating outwardly further results in forces being exerted inwardly from the tubular section 18 through the hinge connection 17 and to the base section 12 whereby the toe portion 16 is maintained in engagement with the inner door 10. Thus, gapping between the base section 12 and the inner door 10 is minimized and sealing about the access opening of the cabinet is improved.

Satisfactory sealing is most difficult to attain at the corners of the gasket. Due to the tendency of the tubular section 18 to rotate inwardly about the hinge connection 17 when the door is closed, the corners of the gasket 11 are stressed in compression or in the direction of the arrows 22 in Fig. 5. As pointed out above, the gasket 11 is formed of an elastic material and because of its section, the gasket can readily buckle at the hinge connection 17. Therefore, in response to the compressive stresses, the portions of the sealing rib 19 formed on the corner portions of the tubular section 18 deform readily to conform to the corner surfaces of the outer case face portion 4 and effect satisfactory corner seals.

While I have shown and described a specific embodiment of my invention, I do not desire my invention to be limited to the particular form shown and described and I intend by the appended claims to cover all modifications within the spirit and scope of my invention.

What I claim as new and desire to secure by Letters Patent of the United States is:

1. A gasket for constructions including a cabinet and a door therefor comprising a member of elastic material having a first section for mounting on said door, a second section, a hinge section for connecting said second section to the outer edge of said first section, an outwardly extending portion formed on the outer edge of said second section, a sealing portion formed on said second section between said hinge section and said outwardly extending portion and projecting toward said cabinet, magnetic means within said second section for attraction by said cabinet to hold said sealing portion in sealing engagement with said cabinet, said second section being rotated inwardly toward said cabinet about said hinge section by said magnetic means when said door is closing, said outwardly extending portion engaging said cabinet in advance of said sealing portion when said door is closing, said magnetic means thereafter rotating said second section outwardly toward said cabinet about said outwardly extending portion whereby said sealing portion is positioned for satisfactory sealing engagement with said cabinet, the minimum air gap between said magnetic means and said cabinet existing across the wall of said second section between said outwardly extending portion and said sealing portion and adjacent said sealing portion whereby said magnetic means tends to continue rotating said second section outwardly toward said cabinet and about said outwardly extending portion for insuring satisfactory sealing engagement between said sealing portion and said cabinet and for exerting forces from said second section to said first section through said hinge section thereby to minimize gapping between the inner edge of said first section and said door.

2. A gasket for constructions including a cabinet and a door therefor comprising a member of elastic material having a base section for mounting on said door, a hinge section formed on the outer edge of said base section, a tubular section connected to the outer edge of said hinge section, a bead formed on the outer edge of said tubular section and inclined toward said cabinet, a sealing rib formed on said tubular section between said hinge section and said bead and projecting toward said cabinet, magnetic means within said tubular section for attraction by said cabinet to hold said sealing rib in sealing engagement with said cabinet, said tubular section being rotated inwardly toward said cabinet about said hinge section by said magnetic means when said door is closing, said bead engaging said cabinet in advance of said sealing rib when said door is closing, said magnetic means thereafter rotating said tubular section outwardly toward said cabinet about said bead whereby said sealing rib is positioned for satisfactory sealing engagement with said cabinet, the minimum air gap between said magnetic means and said cabinet existing across the wall of said tubular section between said bead and said sealing rib and adjacent said sealing rib whereby said magnetic means tends to continue rotating said tubular section outwardly toward said cabinet and about said bead for insuring satisfactory sealing engagement between said sealing rib and said cabinet and for exerting forces inwardly through said hinge section to said base section thereby to minimize gapping between the inner edge of said base section and said door.

3. A gasket for constructions including a cabinet and a door therefor comprising a member of elastic material having a base section, a fastening rib formed on the outer edge of said base section for securing said base section to said door, a toe formed on the inner edge of said base section for engaging said door, a hinge section formed on the outer edge of said base section, a tubular section connected to the outer edge of said hinge section, a bead formed on the outer edge of said tubular section and inclined toward said cabinet, a sealing rib formed on said tubular section between said bead and said hinge section and projecting toward said cabinet, the top of said bead and the top of said sealing rib being in a plane substantially parallel to the face portion of said door, magnetic means within said tubular section for attraction by said cabinet to hold said sealing rib in sealing engagement with said cabinet, said tubular section being rotated inwardly toward said cabinet about said hinge section by said magnetic means when said door is opening, said bead engaging said cabinet in advance of said sealing rib when said door is closing, said magnetic means thereafter rotating said tubular section outwardly toward said cabinet about said bead whereby said sealing rib is positioned for satisfactory sealing engagement with said cabinet, the minimum air gap between said magnetic means and said cabinet existing across the wall of said tubular section between said bead and said sealing rib and adjacent said sealing rib whereby said magnetic means tends to continue rotating said tubular section outwardly toward said cabinet and about said bead for insuring satisfactory sealing engagement between said sealing rib and said cabinet and for exerting forces from said tubular section through said hinge section and base section to said toe thereby to urge said toe against said door.

4. A gasket for constructions including a cabinet and a door therefor comprising a rectangular member of elastic material having a first section for mounting on said door, a second section, a hinge section for connecting said second section to the outer edge of said first section, a continuous outwardly extending portion formed on the outer edge of said second section, a continuous sealing portion formed on said second section between said hinge section and said outwardly extending portion and projecting toward said cabinet, a plurality of magnets arranged spacedly within said second section for attraction by said cabinet to hold said sealing portion in sealing engagement with said cabinet, said second section being rotated inwardly toward said cabinet about said hinge section by said magnets when said door is closing, said outwardly extending portion engaging said cabinet in advance of said sealing portion when said door is closing, said magnets thereafter rotating said second section outwardly toward said cabinet about said outwardly extending portion whereby said sealing portion is positioned for satisfactory sealing engagement with said cabinet, the minimum air gap between said magnets and said cabinet existing across the wall of said second section between said outwardly extending portion and said sealing portion and adjacent said sealing portion whereby said magnets tend to continue rotating said second section outwardly toward said cabinet and about said outwardly extending portion for insuring satisfactory sealing engagement between said sealing portion and said cabinet and for exerting forces from said second section to said first section through said hinge section thereby to minimize gapping between the inner edge of said first section and said door, said tendency for said second section to continue rotating outwardly stressing the corner portions of said elastic member in compression whereby conformance of the corner portions of said sealing portion to said cabinet and satisfactory corner sealing are insured.

5. A gasket for constructions including a cabinet and a door therefor comprising a rectangular member of elastic material having a base section for mounting on said door, a hinge section formed on the outer edge of said base section, a tubular section connected to the outer edge of said hinge section, a continuous bead formed on the outer edge of said tubular section and inclined toward said cabinet, a continuous sealing rib formed on said tubular section between said hinge section and said bead and projecting toward said cabinet, a plurality of magnets arranged spacedly within said tubular section for attraction by said cabinet to hold said sealing rib in sealing engagement with said cabinet, said tubular section being rotated inwardly toward said cabinet about said hinge section by said magnets when said door is closing, said bead engaging said cabinet in advance of said sealing rib when said door is closing, said magnets thereafter rotating said tubular section outwardly toward said cabinet about said bead whereby said sealing rib is positioned for satisfactory sealing engagement with said cabinet, the minimum air gap between said magnets and said cabinet existing across the wall of said tubular section between said bead and said sealing rib and adjacent said sealing rib whereby said magnets tend to continue rotating said tubular section outwardly toward said cabinet and about said bead for insuring satisfactory sealing engagement between said sealing rib and said cabinet and for exerting forces inwardly through said hinge section to said base section thereby to minimize gapping between the inner edge of said base section and said door, said tendency for said tubular section to continue rotating outwardly stressing the corner portions of said elastic member in compression whereby conformance of the corner portions of said sealing rib to said cabinet and satisfactory corner sealing are insured.

6. A gasket for constructions including a cabinet and a door therefor comprising a rectangular member of elastic material having a base section, a continuous fastening rib formed on the outer edge of said base section for securing said base section to said door, a continuous toe formed on the inner edge of said base section for engaging said door, a hinge section formed on the outer edge of said base section, a tubular section connected to the outer edge of said hinge section, a continuous bead formed on the outer edge of said tubular section and inclined toward said cabinet, a continuous sealing rib formed on said tubular section between said bead and said hinge section and projecting toward said cabinet, the top of said bead and the top of said sealing rib being in a plane substantially parallel to the face portion of said door, a plurality of magnets arranged spacedly within said tubular section for attraction by said cabinet to hold said sealing rib in sealing engagement with said cabinet, said tubular section being rotated inwardly toward said cabinet about said hinge section by said magnets when said door is closing, said bead engaging said cabinet in advance of said sealing rib when said door is closing, said magnets thereafter rotating said tubular section outwardly toward said cabinet about said bead whereby said sealing rib is positioned for satisfactory sealing engagement with said cabinet, the minimum air gap between said magnets and said cabinet existing across the wall of said tubular section between said bead and said sealing rib and adjacent said sealing rib whereby said magnets tend to continue rotating said tubular section outwardly toward said cabinet and about said bead for insuring satisfactory sealing engagement between said sealing rib and said cabinet and for exerting forces from said tubular section through said hinge section and base section to said toe thereby to urge said toe against said door, said tendency for said tubular section to continue rotating outwardly stressing the corner portions of said elastic member in compression whereby conformance of the corner portions of said sealing rib to said cabinet and satisfactory corner sealing are insured.

HAROLD P. HARLE.

REFERENCES CITED

The following references are of record in the file of this patent:

UNITED STATES PATENTS

| Number | Name | Date |
|---|---|---|
| 2,471,635 | Mark et al. | May 31, 1949 |